US012748287B2

(12) United States Patent
Fujisaki

(10) Patent No.: US 12,748,287 B2
(45) Date of Patent: Sep. 29, 2026

(54) OPTICAL SYSTEM AND IMAGE PICKUP APPARATUS

(71) Applicant: CANON KABUSHIKI KAISHA, Tokyo (JP)

(72) Inventor: Toyokatsu Fujisaki, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 18/816,516

(22) Filed: Aug. 27, 2024

(65) Prior Publication Data

US 2025/0130403 A1 Apr. 24, 2025

(30) Foreign Application Priority Data

Oct. 20, 2023 (JP) ................................ 2023-180667

(51) Int. Cl.

*G02B 13/00* (2006.01)
*G02B 5/00* (2006.01)
*G02B 9/62* (2006.01)

(52) U.S. Cl.

CPC ......... *G02B 13/0045* (2013.01); *G02B 5/005* (2013.01); *G02B 9/62* (2013.01); *G02B 13/0055* (2013.01)

(58) Field of Classification Search

None
See application file for complete search history.

(56) References Cited

U.S. PATENT DOCUMENTS

2015/0226940 A1 8/2015 Kubota et al.
2024/0192464 A1* 6/2024 Mori ........................ G02B 9/10

FOREIGN PATENT DOCUMENTS

JP 2014089241 A 5/2014

* cited by examiner

*Primary Examiner* — Phu Vu
(74) *Attorney, Agent, or Firm* — ROSSI, KIMMS & McDOWELL LLP

(57) ABSTRACT

An optical system includes a front group, an aperture stop configured to determine an on-axis light beam, and a rear group. The front group includes a negative lens, and a first positive lens disposed on an image side of the negative lens. The rear group includes at least two positive lenses. Predetermined inequalities are satisfied.

13 Claims, 5 Drawing Sheets

OPTICAL SYSTEM AND IMAGE PICKUP APPARATUS

BACKGROUND

Technical Field

One of the aspects of the embodiments relates to an optical system suitable for a variety of image pickup apparatuses.

Description of Related Art

Image pickup apparatuses such as digital cameras, smartphone cameras, in-vehicle (on-board) cameras, and surveillance cameras are demanded to have optical systems with a reduced size and weight, and good optical performance over the entire angle of view. Smartphone cameras, in particular, often use small, fixed-aperture, and single-focus optical systems using plastic-molded aspherical lenses. They are further demanded to have an iris diaphragm, an ND filter, and a shutter in addition to a short overall length suitable for moving image capturing.

Japanese Patent Laid-Open No. 2014-89241 discloses a single focus optical system that includes, in order from the object side to the image side, a negative lens, a negative lens, a positive lens, and an aperture stop.

SUMMARY

An optical system according to one aspect of the disclosure includes a front group, an aperture stop configured to determine an on-axis light beam, and a rear group. The front group includes a negative lens, and a first positive lens disposed on an image side of the negative lens. The rear group includes at least two positive lenses. The following inequalities are satisfied:

$$0.10 \leq ST/TTL \leq 0.50$$

$$3.0 \leq |fA/f|$$

$$0.01 \leq Bf/f \leq 1.002$$

where ST is a distance on an optical axis between a lens surface on the image side of a lens adjacent to and disposed on the object side of the aperture stop and a lens surface on the object side of a lens adjacent to and disposed on the image side of the aperture stop, TTL is an air equivalent value of a distance on the optical axis from a lens surface closest to an object of the optical system to an image plane, Bf is an air equivalent value of a distance on the optical axis from a lens surface closest to the image plane to the image plane, f is a focal length of the optical system, and fA is a focal length of the front group. An image pickup apparatus having the above optical system also constitutes another aspect of the disclosure.

Further features of the disclosure will become apparent from the following description of embodiments with reference to the attached drawings.

DESCRIPTION OF THE EMBODIMENTS

Figure 1:
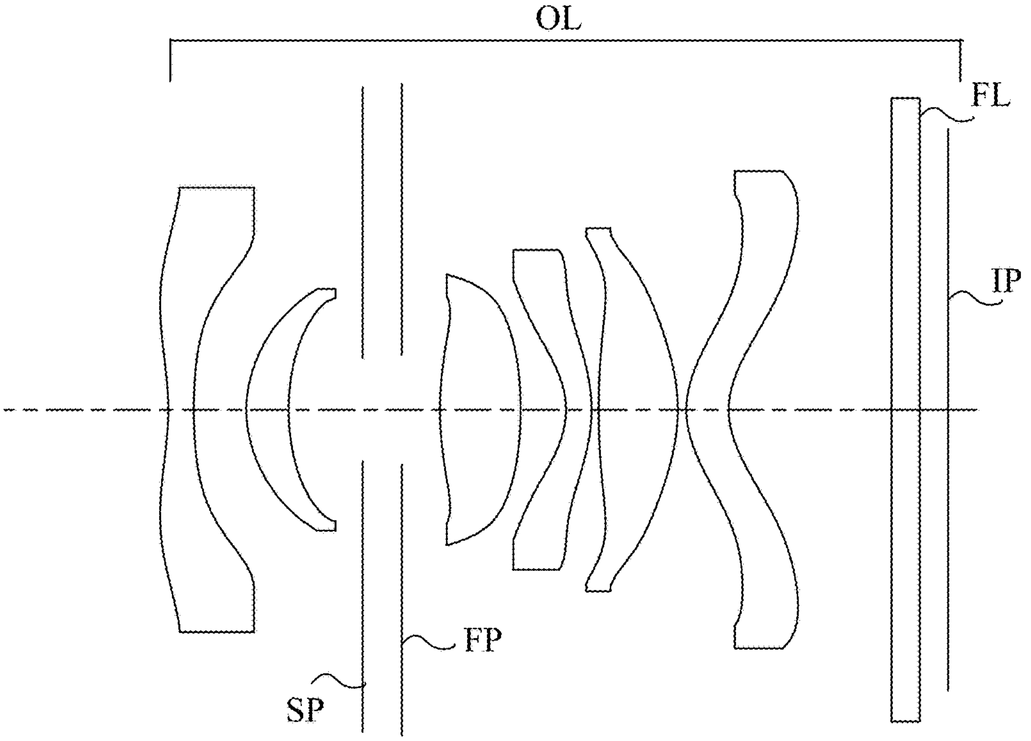
FIG. 1 is a sectional view of an optical system according to Example 1.

Referring now to the accompanying drawings, a description will be given of embodiments according to the disclosure.

Before specific Examples 1 to 4 are described, a description will be given of matters common to each embodiment. FIGS. 1, 3, 5, and 7 illustrate sections of the optical systems OL according to Examples 1, 2, 3, and 4, respectively, in an in-focus state at infinity.

The optical system OL according to each example is used as an imaging optical system for a variety of image pickup apparatuses, such as video cameras, digital still cameras, smartphone cameras, surveillance cameras, night vision cameras, and in-vehicle cameras. The optical system according to each example may also be used as a projection optical system of an image projection apparatus (projector). In each figure, a left side is an object side (front side), and a right side is an image side (rear side).

The optical system OL according to each example includes, from the object side to the image side, a negative lens, at least one positive lens, an aperture stop SP configured to determine an on-axis light beam, and at least two positive lenses. "from the object side to the image side" means that the negative lens, at least one positive lens, the aperture stop SP, and at least two positive lenses do not have to be arranged in this order. That is, another negative lens may be disposed between the negative lens on the object side of the aperture stop SP and at least one positive lens, or a negative lenses other than at least two positive lenses may be disposed on the image side of the aperture stop SP. More specifically, the optical system OL according to each example includes a front group, the aperture stop SP, and a rear group. The front group includes a negative lens, and a first positive lens disposed on an image side of the negative lens. The rear group includes at least two positive lenses.

The aperture stop SP may also have a function of determining (limiting) a light beam of the maximum aperture (minimum F-number (Fno)) of the optical system OL. The optical system OL further includes a flare cut diaphragm FP configured to cut unnecessary light (flare light), but may not include the flare cut diaphragm FP.

An imaging surface of an image sensor (photoelectric conversion element) such as a CCD sensor or CMOS sensor, or a film surface (photosensitive surface) of a silver film is disposed on an image plane IP. In the optical system OL according to each example, an optical block FL that has no effective refractive power, such as an optical filter (low-pass filter, infrared cut filter, etc.), a face plate, or a sensor protective glass, is disposed between a lens closest to the image plane (final lens) and the image plane IP.

The optical system OL according to each example may perform focusing by moving all or part of its lenses in the optical axis direction.

A description will now be given of characteristics of the optical system OL according to each example. The optical system OL according to each example includes, from the object side to the image side, a negative lens, at least one positive lens, and an aperture stop, thereby providing a wide angle and satisfactorily correcting lateral chromatic aberration. In order to reduce an overall optical length TTL of the optical system OL, at least two positive lenses are arranged on the image side of the aperture stop SP. This configuration can reduce the back focus and thereby the overall optical length of the optical system OL.

The optical system OL according to each example satisfies the following inequalities (1), (2), and (3) in order to arrange an optical element such as an iris stop, an ND filter, and a shutter in a proper position and to facilitate the manufacture of the optical system:

$$0.10 \leq ST/TTL \leq 0.50 \quad (1)$$

$$3.0 \leq |fA/f| \quad (2)$$

$$0.01 \leq Bf/f \leq 1.00\,2 \quad (3)$$

In these inequalities, ST is a distance on the optical axis between a lens surface on the image side of a lens adjacent to and disposed on the object side of the aperture stop SP and a lens surface on the object side of a lens adjacent to and disposed on the image side of the aperture stop SP. TTL is an overall optical length of the optical system OL, which is an overall optical length as an air equivalent value of the distance on the optical axis from a lens surface (front surface) closest to the object of the optical system OL to the image plane IP. bf is a back focus, which is air equivalent of a distance on the optical axis from a lens surface (final surface) closest to the image plane of the optical system OL to the paraxial image plane. f is a focal length of the optical system OL, and fA is a combined focal length of the negative lens and at least one positive lens on the object side of the aperture stop SP.

Inequality (1) defines a proper relationship between the distance ST between the lenses before and after the aperture stop SP and the overall optical length TTL. In a case where ST/TTL becomes higher than the upper limit of inequality (1), the distance ST becomes too large relative to the overall optical length TTL, and the lens diameter and the size of the optical system increase. In a case where ST/TTL becomes lower than the lower limit of inequality (1), it becomes difficult to dispose an optical element such as the iris stop, ND filter, and shutter.

Inequality (2) defines a proper relationship between the combined focal length fA of the plurality of lenses on the front side of the aperture stop SP and the focal length f of the entire system for miniaturization. In a case where |fA/f| becomes higher than the upper limit of inequality (2), spherical aberration increases due to the distance misalignment between the plurality of lenses on the front side of the aperture stop SP and manufacturing becomes difficult.

Inequality (3) defines a proper relationship between the back focus bf and the focal length f of the entire system in order to reduce the overall length. In a case where bf/f becomes higher than the upper limit of inequality (3), the back focus bf becomes too long, and it becomes difficult to reduce the overall length. In addition, it becomes difficult to correct astigmatism in an attempt to reduce the overall length. In a case where bf/f becomes lower than the lower limit of inequality (3), the back focus bf becomes too short, and dust is likely to adhere to the cover glass or filter in front of the image plane IP and to be captured when an aperture in the iris diaphragm is narrowed for moving image capturing.

The above configuration and inequalities (1) to (3) can provide a small, lightweight, wide-angle optical system that can include an optical element such as an iris diaphragm, ND filter, and shutter at a proper position, have a short overall length and a small outer diameter.

Inequalities (1) to (3) may be replaced with inequalities (1a) to (3a) below:

$$0.12 \leq ST/TTL \leq 0.40 \quad (1a)$$

$$3.2 \leq |fA/f| \quad (2a)$$

$$0.05 \leq bf/f \leq 0.95 \quad (3a)$$

Inequalities (1) to (3) may be replaced with inequalities (1b) to (3b) below:

$$0.13 \leq ST/TTL \leq 0.30 \quad (1b)$$

$$35 \leq |fA/f| \quad (2b)$$

$$0.10 \leq bf/f \leq 0.90 \quad (3b)$$

Inequality (2) may be set to $|fA/f| \leq 13.0$ or 12.0. It becomes easy to suppress spherical aberration and the like by reducing the absolute value of the combined focal length of the plurality of lenses on the front side of the aperture stop SP so that the value |fA/f| becomes lower than the upper limit.

A description will now be given of configurations and inequalities that may be satisfied by the optical system OL according to each example. The optical system OL according to each example may satisfy at least one of the following configurations and inequalities (4) to (11).

A lens surface on the image side (final surface) of the final lens closest to the image plane of the optical system OL may be an aspheric surface having at least one inflection point. The inflection point means a point where a value of a second derivative obtained by differentiating x(h) twice with respect to h is 0, and the sign of the second derivative changes before and after that point, where x(h) is an aspheric shape, x is a displacement from a surface vertex in the optical axis direction, and h is a height from a direction orthogonal to the optical axis (radial direction). In other words, it means a point where the surface shape switches from a concave shape to a convex shape or from a convex shape to a concave shape. By having an inflection point, the refractive power of the periphery of the aspheric surface can be determined independently of the refractive power of the paraxial part (center part), and it becomes easier to correct the curvature of field. Furthermore, this configuration can prevent an incident angle of the light passing through the optical system OL on the image plane (imaging surface of the image sensor) from becoming large. The position of the inflection point can be located at any position radially outward from the optical axis as long as it is within the effective diameter of the final surface, and may be located in the periphery.

As the overall optical length of the optical system OL is reduced, the power (the reciprocal of the focal length) of the positive lenses included in the optical system OL increases, and the Petzval sum of the plurality of lenses on the object side of the final lens becomes positive. Therefore, a large amount of curvature of field occurs toward the object side, and in an attempt to correct the curvature of field with a single final lens, it becomes difficult to correct the curvature of field if the lens has the same sign at the central portion and periphery. In order to effectively correct the curvature of field, aberration may be corrected by the final surface as an aspheric surface with an inflection point where the power differs between the central portion and periphery.

The following inequality (4) may be satisfied:

$$0.4 \leq STf/STb \leq 0.9 \tag{4}$$

where STf is a distance on the optical axis between the aperture stop SP and a lens surface on the object side of the final lens, and STb is a distance on the optical axis between the aperture stop SP and a point obtained by projecting onto the optical axis a point closest to the image plane on the final surface.

Inequality (4) defines a proper relationship between the distances STf and STb to achieve both good correction of curvature of field by the final lens and the size reduction of the optical system OL. In a case where STf/STb becomes higher than the upper limit of inequality (4), the correction of curvature of field by the final lens becomes insufficient. In a case where STf/STb becomes lower than the lower limit of inequality (4), a sag amount between the optical axis and the periphery of the final surface becomes too large, the final lens occupies a large volume in the optical axis direction, and the size of the optical system OL increases.

The following inequality (5) may be satisfied:

$$3.0 \leq |fi/f| \tag{5}$$

where fi is a focal length of the final lens.

Inequality (5) defines a proper relationship between the focal length fi of the final lens and the focal length f of the entire system to achieve good correction of curvature of field while reducing the overall length. In a case where the focal length fi of the final lens becomes too small relative to the focal length f of the entire system so that |fi/f| becomes lower than the lower limit of inequality (5), the effect of correcting the curvature of field near a low image height reduces, and it becomes difficult to correct aberrations.

The following inequalities (6) and (7) may be satisfied:

$$1.50 \leq Ndi \leq 1.80 \tag{6}$$

$$30 \leq \nu di \leq 65 \tag{7}$$

where Ndi is a refractive index of the final lens for the d-line, and νdi is an Abbe number of the final lens based on the d-line.

Inequality (6) defines a proper range of the refractive index Ndi of the optical material of the final lens to effectively correct the curvature of field while reducing the overall length. In a case where Ndi becomes lower than the lower limit of inequality (6), the size of the final lens increases, and thereby the size of the optical system increases. In a case where Ndi becomes higher than the upper limit of inequality (6), the effect of correcting the curvature of field at a low image height reduces, and thereby an aberration correcting effect reduces.

Inequality (7) defines a proper range of the Abbe number νdi of the optical material of the final lens in order to satisfactorily correct lateral chromatic aberration while reducing the overall length. In a case where νdi becomes lower than the lower limit of inequality (7), lateral chromatic aberration increases mainly on a long wavelength side, and it becomes difficult to obtain good optical performance. In a case where νdi becomes higher than the upper limit of inequality (7), lateral chromatic aberration increases mainly on a short wavelength side, and it becomes difficult to obtain good optical performance.

The following inequalities (8) and (9) may be satisfied:

$$1.50 \leq Ndn \leq 1.80 \tag{8}$$

$$30 \leq \nu dn \leq 65 \tag{9}$$

where Ndn is a refractive index for the d-line of the negative lens on the object side of the aperture stop SP, and νdn is an Abbe number of the negative lens based on the d-line.

Inequality (8) defines a proper range of the refractive index Ndn of the optical material of the negative lens to reduce the diameter of the negative lens disposed on the object side of the aperture stop SP, to widen the angle, and to effectively correct distortion. In a case where Ndn becomes lower than the lower limit of inequality (8), the diameter of the negative lens increases, and thereby the size of the optical system increases. In a case where Ndn becomes higher than the upper limit of inequality (8), negative distortion occurs significantly, and lateral chromatic aberration increases.

Inequality (9) defines a proper range of the Abbe number νdn of the negative lens to satisfactorily correct lateral chromatic aberration, to widen the angle, and to reduce the diameter of the negative lens. In a case where νdn becomes lower than the lower limit of inequality (9), lateral chromatic aberration on a short wavelength side becomes under corrected, and it becomes difficult to correct the lateral chromatic aberration. In a case where νdn becomes higher than the upper limit of inequality (9), chromatic aberration on a short wavelength side becomes over corrected, and it becomes difficult to correct the chromatic aberration.

The following inequalities (10) and (11) may be satisfied:

$$1.50 \leq Ndp \leq 1.80 \tag{10}$$

$$18 \leq \nu dp \leq 45 \tag{11}$$

where Ndp is a refractive index for the d-line of any one of the at least one positive lens on the object side of the aperture stop SP, and νdp is an Abbe number of that positive lens based on the d-line.

Inequality (10) defines a proper range of the refractive index Ndp of the positive lens to properly correct spherical aberration, to widen the angle, and to reduce the diameter of the positive lens. In a case where Ndp becomes lower than the lower limit of inequality (10), the size of the positive lens increases, and thereby the size of the optical system increases. In a case where Ndp becomes higher than the upper limit of inequality (10), the sensitivity of the spherical aberration to manufacturing errors increases.

Inequality (11) defines a proper range of the Abbe number νdp of the positive lens to properly correct longitudinal chromatic aberration, to widen the angle, and to reduce the diameter of the positive lens. In a case where νdp becomes lower than the lower limit of inequality (11), longitudinal chromatic aberration on a short wavelength side becomes under corrected, and its correction becomes difficult. In a case where νdp becomes higher than the upper limit of inequality (11), chromatic aberration on a short wavelength side becomes over corrected, and its correction becomes difficult.

In order to secure space for an optical element such as an iris diaphragm, an ND filter, and a shutter and to reduce the size of the optical system OL, both of the two lenses adjacent to and disposed on the object and image sides of the aperture stop SP may be positive lenses. This configuration can reduce the diameter of the lens near the aperture stop SP, and the size of the optical system OL.

The above configuration and inequalities can provide a small, wide-angle optical system OL that can satisfactorily correct various aberrations, secure space for an optical element such as an iris diaphragm, an ND filter, and a shutter, and facilitate manufacturing.

The final lens, the negative lens and the positive lens on the object side of the aperture stop SP may be plastic lenses. These plastic lenses increase the degree of freedom in shape, and can satisfactorily correct mainly curvature of field and distortion.

Inequalities (4) to (11) may be replaced with inequalities (4a) to (11a) below:

$$0.50 \le STf/STb \le 0.85 \tag{4a}$$

$$3.2 \le |fi/f| \tag{5a}$$

$$1.51 \le Ndi \le 1.70 \tag{6a}$$

$$40 \le \nu di \le 60 \tag{7a}$$

$$1.51 \le \nu dn \le 1.70 \tag{8a}$$

$$40 \le \nu dn \le 60 \tag{9a}$$

$$1.51 \le Ndp \le 1.70 \tag{10a}$$

$$20 \le \nu dp \le 45 \tag{11a}$$

Inequalities (4) to (11) may be replaced with inequalities (4b) to (11b) below:

$$0.60 \le STf/STb \le 0.80 \tag{4b}$$

$$3.4 \le |fi/f| \tag{5b}$$

$$1.52 \le Ndi \le 1.60 \tag{6b}$$

$$50 \le \nu di \le 58 \tag{7b}$$

$$1.52 \le Ndi \le 1.60 \tag{8b}$$

$$50 \le \nu di \le 58 \tag{9b}$$

$$1.53 \le Ndp \le 1.65 \tag{10b}$$

-continued $$25 \le \nu dp \le 40 \tag{11b}$$

In inequality (5), |fi/f| may be ≤25.0 or 23.0. It becomes easy to suppress lateral chromatic aberration and the like by reducing the absolute value of the focal length of the final lens so that the value |fi/f| becomes lower than the upper limit.

Specific examples 1 to 4 will be described below. After the description of Examples 1 to 4, numerical examples 1 to 4 corresponding to Examples 1 to 4 will be illustrated.

Example 1

An optical system OL according to Example 1 illustrated in FIG. 1 includes, in order from the object side to the image side, a negative lens, a positive lens, an aperture stop SP, a flare cut diaphragm FP, a positive lens, a negative lens, a positive lens, and a positive lens. The ND filter and the shutter are adjacent to and disposed on the object side or the image side of the aperture stop.

In numerical example 1 (and other numerical examples described later), the surface number m indicates the order of the surface counting from the object side. r represents a radius of curvature (mm) of an m-th surface from the object side, d represents a lens thickness or air space (mm) between m-th and (m+1)-th surfaces, and nd represents a refractive index for the d-line of the optical material between the m-th and (m+1)-th surface. νd is an Abbe number based on the d-line of the optical material between the m-th and (m+1)-th surfaces. The Abbe number νd based on the d-line is expressed as νd=(Nd−1)/(NF−NC) where Nd, NF, and NC are the refractive indices for the d-line (wavelength 587.6 nm), F-line (wavelength 486.1 nm), and C-line (wavelength 656.3 nm) in the Fraunhofer lines.

bf represents a back focus (mm) described above. An overall lens length corresponds to the overall optical length TTL of the optical system OL.

An asterisk (*) next to a surface number means that the surface is aspheric. The aspheric shape is expressed by the following equation:

$$X = \frac{\frac{H^2}{R}}{1 + \sqrt{1 - (1 + K)\left(\frac{H}{R}\right)^2}} + A4H^4 + A6H^6 + A8H^8 + A10H^{10} + A12H^{12}$$

where X is a displacement from a surface vertex in the optical axis direction, His a height from the optical axis in a direction perpendicular to the optical axis, a light traveling direction is set positive, R is a paraxial radius of curvature, K is a conic constant, and A4, A6, A8, A10, and A12 are aspheric coefficients.

"e±x" in the conic constant and aspherical coefficient means×$10^{\pm x}$.

Table 1 summarizes various values corresponding to inequalities (1) to (11) in numerical example 1. The optical system OL according to numerical example 1 satisfies all of inequalities (1) to (11).

Figure 2:
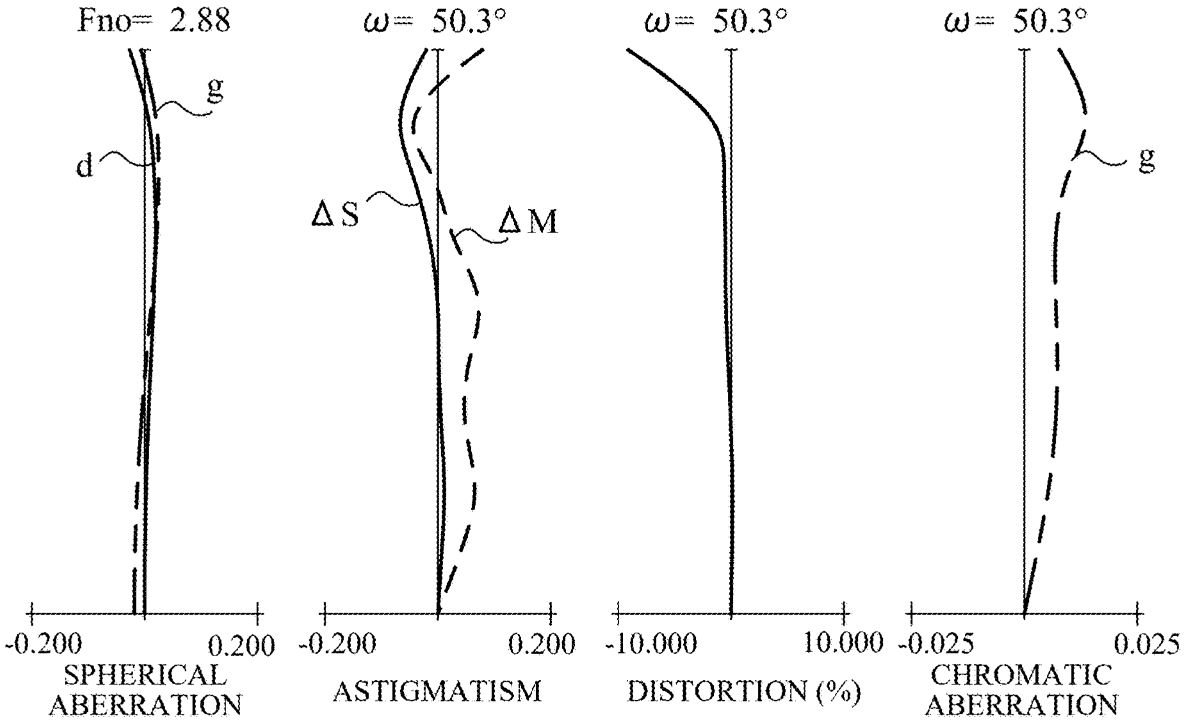
FIG. 2 is an aberration diagram of the optical system according to Example 1.

FIG. 2 illustrates a longitudinal aberration (spherical aberration, astigmatism, distortion, and chromatic aberration) of the optical system OL according to numerical example 1 in an in-focus state at infinity. In the spherical aberration diagram, Fno represents an F-number. A solid line indicates a spherical aberration amount for the d-line, and a long and two short dashes line indicates a spherical aberration amount for the g-line (wavelength 435.8 nm). In the astigmatism diagram, a solid line S indicates an astigmatism amount on a sagittal image plane, and a dashed line M indicates an astigmatism amount on a meridional image plane. The distortion diagram illustrates a distortion amount for the d-line. The chromatic aberration diagram illustrates a lateral chromatic aberration amount for the g-line. ω represents a half angle of view (°). The description of each aberration diagram is similarly applicable to the other examples.

Example 2

Figure 3:
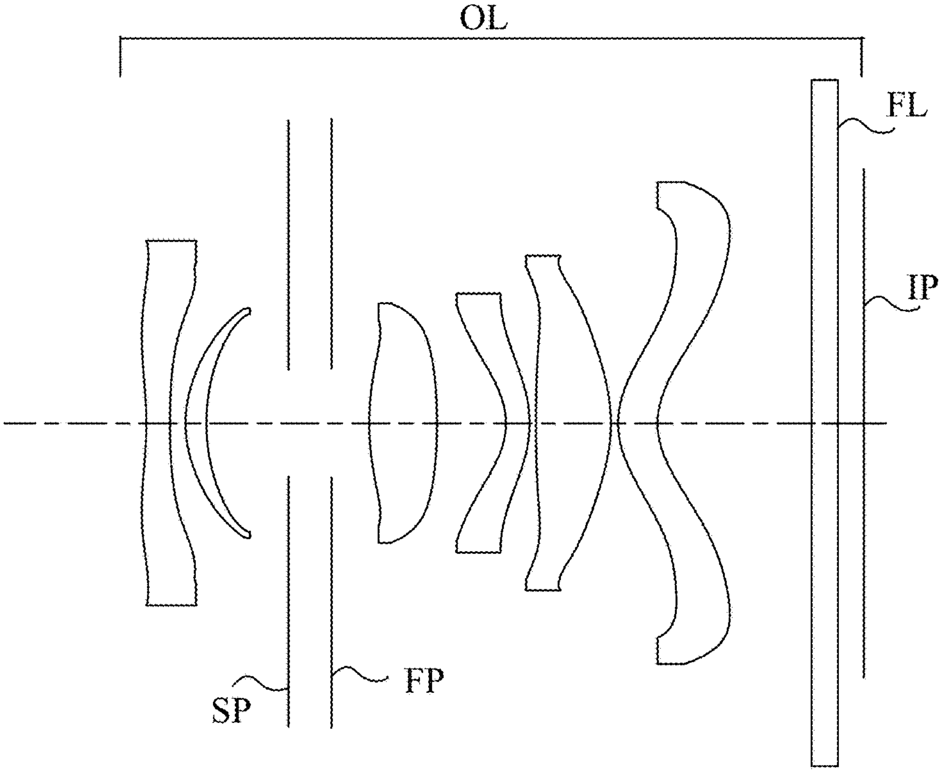
FIG. 3 is a sectional view of an optical system according to Example 2.

An optical system OL according to Example 2 illustrated in FIG. 3 includes, in order from the object side to the image side, a negative lens, a positive lens, an aperture stop SP, a flare cut diaphragm FP, a positive lens, a negative lens, a positive lens, and a positive lens.

Table 1 summarizes various values corresponding to inequalities (1) to (11) in numerical example 2. The optical system OL according to numerical example 2 satisfies all of inequalities (1) to (11).

Figure 4:
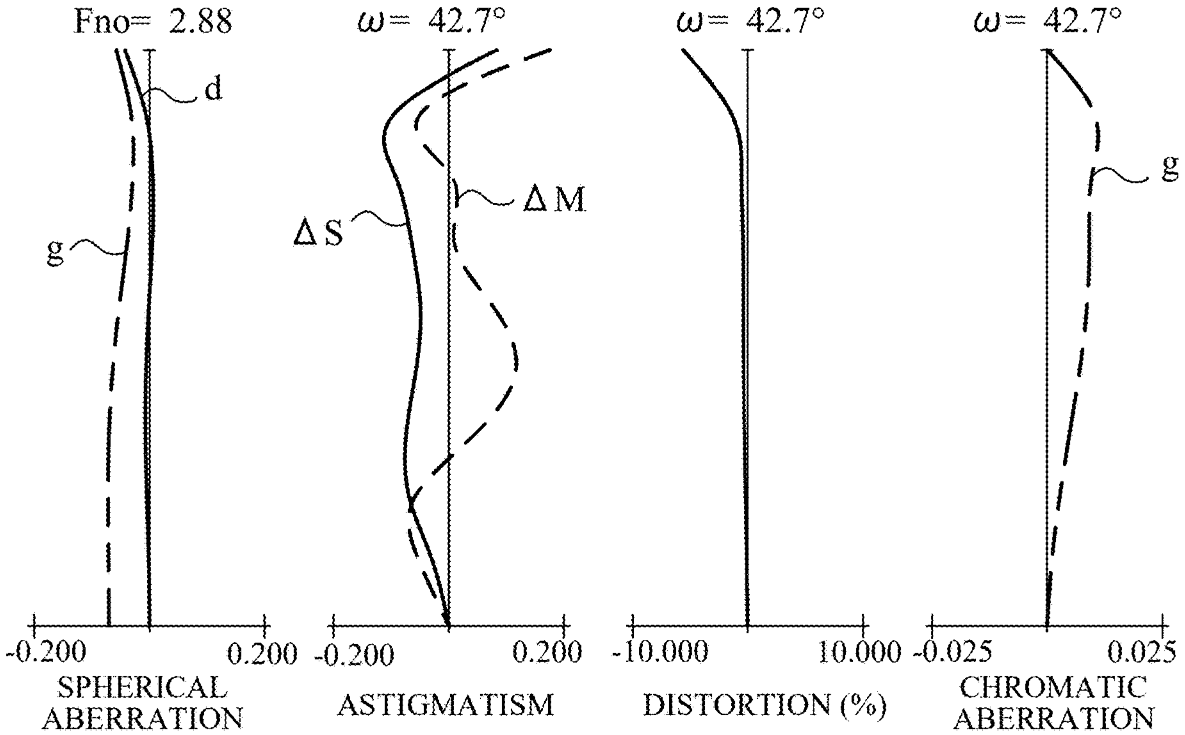
FIG. 4 is an aberration diagram of the optical system according to Example 2.

FIG. 4 illustrates a longitudinal aberration of the optical system OL according to numerical example 2 in an in-focus state at infinity.

Example 3

Figure 5:
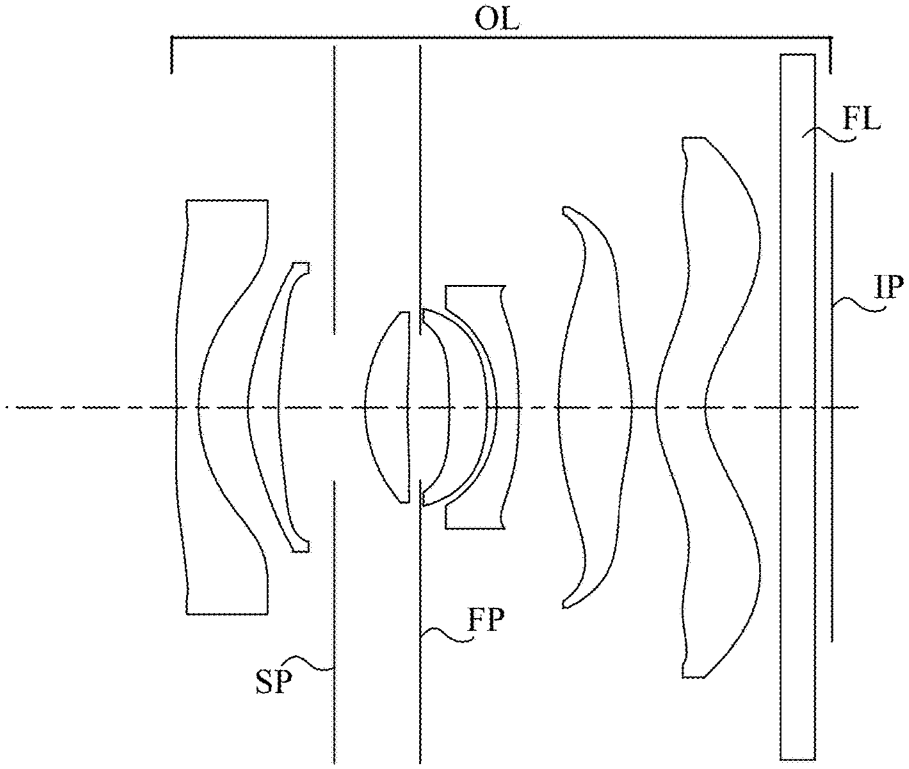
FIG. 5 is a sectional view of an optical system according to Example 3.

An optical system OL according to Example 3 illustrated in FIG. 5 includes, in order from the object side to the image side, a negative lens, a positive lens, an aperture stop SP, a positive lens, a flare cut diaphragm FP, a positive lens, a negative lens, a positive lens, and a negative lens.

Table 1 summarizes various values corresponding to inequalities (1) to (11) in numerical example 3. The optical system OL according to numerical example 3 satisfies all of inequalities (1) to (11).

Figure 6:
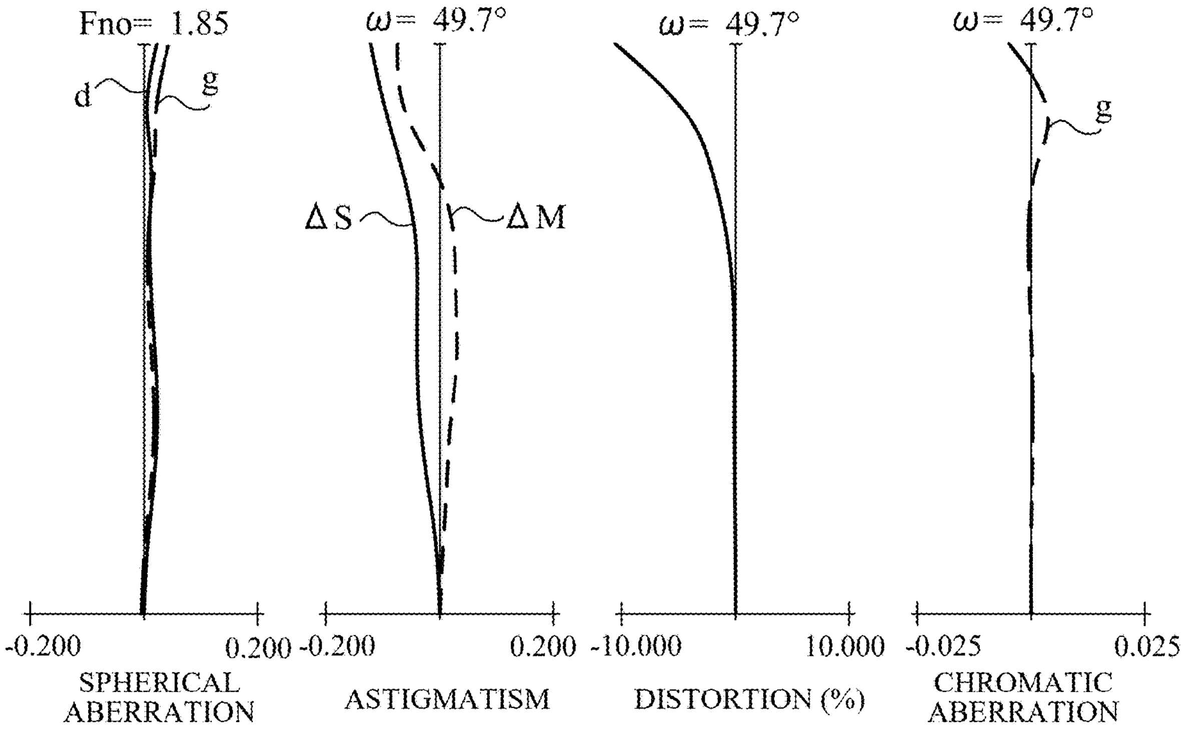
FIG. 6 is an aberration diagram of the optical system according to Example 3.

FIG. 6 illustrates a longitudinal aberration of the optical system OL according to numerical example 3 in an in-focus state at infinity.

Example 4

Figure 7:
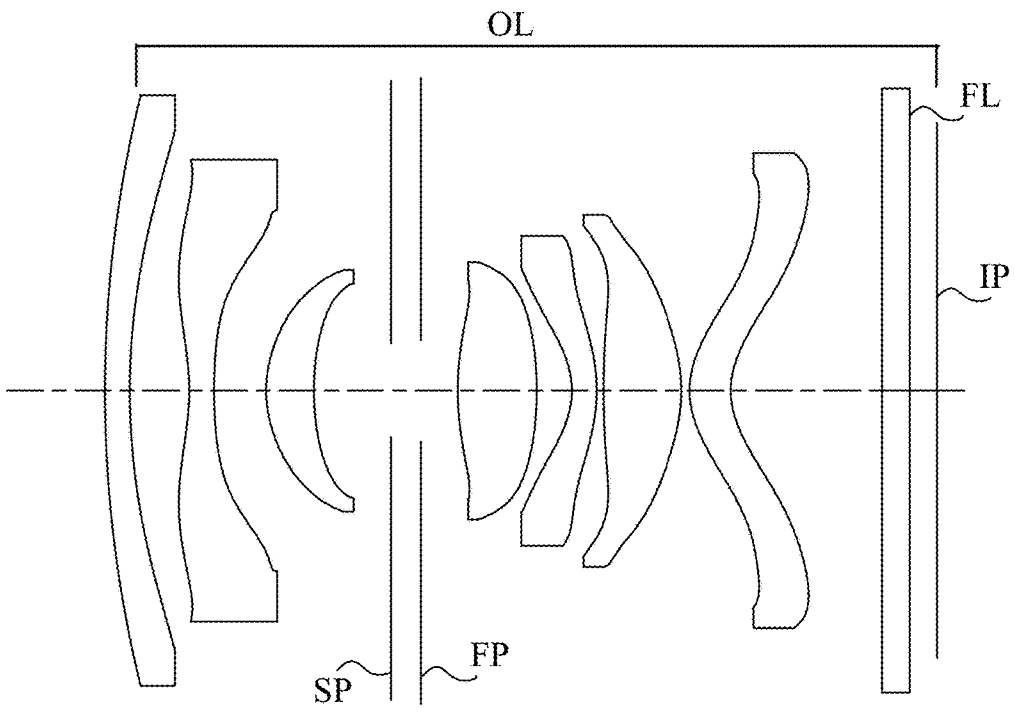
FIG. 7 is a sectional view of an optical system according to Example 4.

An optical system OL according to Example 4 illustrated in FIG. 7 includes, in order from the object side to the image side, a negative lens, a negative lens, a positive lens, an aperture stop SP, a flare cut diaphragm FP, a positive lens, a negative lens, a positive lens, and a positive lens.

Table 1 summarizes various values corresponding to inequalities (1) to (11) in numerical example 4. The optical system OL according to numerical example 4 satisfies all of inequalities (1) to (11).

Figure 8:
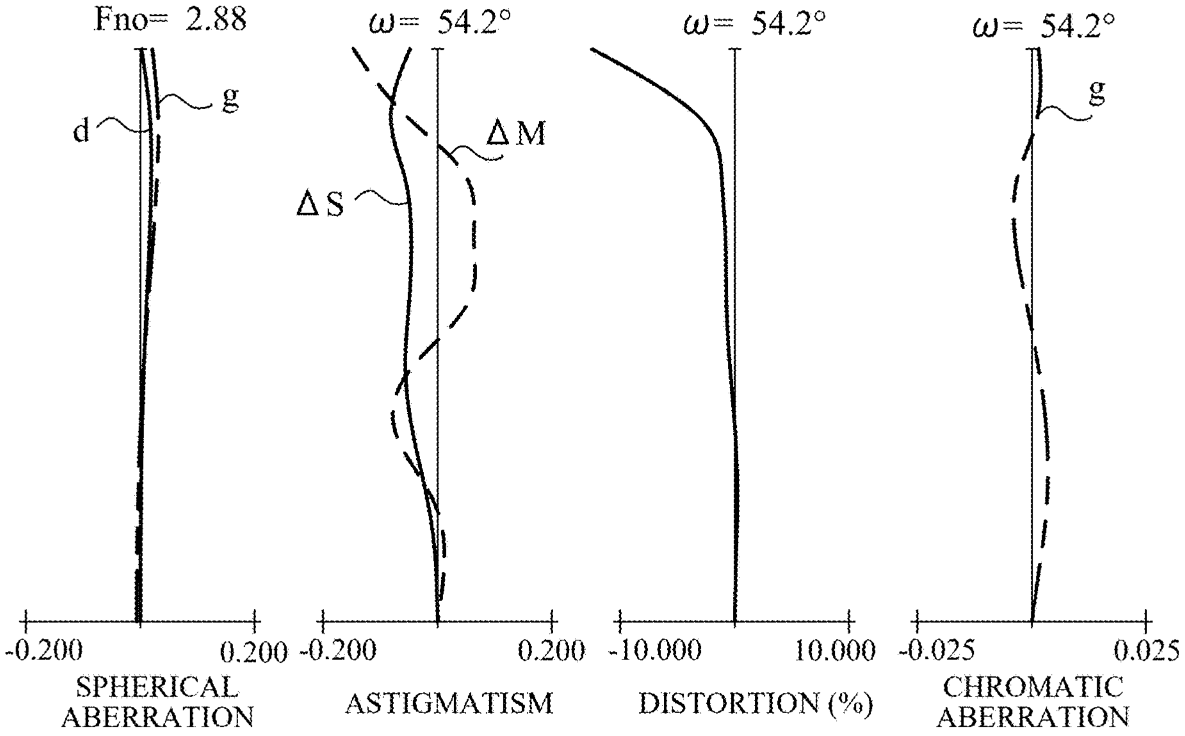
FIG. 8 is an aberration diagram of the optical system according to Example 4.

FIG. 8 illustrates a longitudinal aberration of the optical system OL according to numerical example 4 in an in-focus state at infinity.

Numerical Example 1

UNIT: mm

SURFACE DATA

| Surface No. | r | d | nd | νd |
|---|---|---|---|---|
| 1* | −10.228 | 0.90 | 1.53504 | 55.7 |
| 2* | 17.853 | 1.86 | | |
| 3* | 4.545 | 1.50 | 1.56650 | 37.6 |
| 4* | 8.360 | 2.61 | | |
| 5 (SP) | ∞ | 1.38 | | |
| 6 | ∞ | 1.35 | | |
| 7* | 12.317 | 2.85 | 1.53504 | 55.7 |
| 8* | −14.065 | 1.61 | | |
| 9* | −3.147 | 0.90 | 1.67070 | 19.3 |
| 10* | −6.229 | 0.25 | | |
| 11* | 27.893 | 2.80 | 1.53504 | 55.7 |
| 12* | −7.179 | 0.30 | | |
| 13* | 3.532 | 1.50 | 1.53504 | 55.7 |
| 14* | 3.173 | 5.75 | | |
| 15 | ∞ | 1.00 | 1.51633 | 64.1 |
| 16 | ∞ | 1.00 | | |
| Image Plane | ∞ | | | |

Aspheric Data

1st Surface $$K=-1.77956e+01\ A4=1.30990e-03\ A6=-2.24297e-05$$
$$A8=2.10405e-07\ A10=-1.10983e-09$$

2nd Surface $$K=6.03834e+00\ A4=3.38436e-04\ A6=6.83267e-05$$
$$A8=-2.19618e-06\ A10=1.10718e-08$$

3rd Surface $$K=-5.29724e-01\ A4=-2.42894e-03\ A6=1.92242e-04$$
$$A8=-3.61956e-06$$

4th Surface $$K=3.09913e+00\ A4=-8.58644e-04\ A6=8.43854e-05$$
$$A8=-8.23347e-07\ A10=-2.24765e-07$$

7th Surface $$K=-1.27235e+01\ A4=4.08550e-04\ A6=-6.23451e-05$$
$$A8=1.90739e-06\ A10=-1.74021e-07$$

8th Surface $$K=-2.97634e+01\ A4=-2.05919e-03\ A6=1.19841e-05$$
$$A8=3.85427e-06\ A10=-2.52070e-07$$

9th Surface $$K=-3.31548e+00\ A4=-4.02636e-03\ A6=5.23604e-04$$
$$A8=-2.07299e-05\ A10=2.74666e-07$$

10th Surface $$K=-183996e+00\ A4=1.07347e-03\ A6=4.37680e-05$$
$$A8=-1.00835e-06\ A10=-8.20225e-09$$

11th Surface $$K=0.00000e+00\ A4=8.00821e-05\ A6=1.02870e-06$$
$$A8=-1.55528e-06\ A10=2.59717e-08$$

12th Surface $$K=0.00000e+00\ A4=8.28023e-04\ A6=6.12617e-05$$
$$A8=-3.47302e-06\ A10=5.00089e-08$$

-continued

13th Surface $$K=-2.25142e+00\ A4=-6.63509e-04\ A6=-3.60680e-05$$

$$A8=1.03994e-06\ A10=-7.87189e-09$$

14th Surface $$K=-1.70346e+00\ A4=-2.08085e-03\ A6=2.64416e-05$$

$$A8=-7.64220e-08\ A10=-7.38527e-10$$

| | |
|---|---|
| Focal Length | 9.47 |
| Fno | 2.88 |
| Half Angle of View[°] | 47.57 |
| Image Height | 10.36 |
| Overall Lens Length | 27.22 |
| bf | 7.41 |

Numerical Example 2

UNIT: mm

SURFACE DATA

| Surface No. | r | d | nd | νd |
|---|---|---|---|---|
| 1* | −13.520 | 0.90 | 1.53504 | 55.7 |
| 2* | 30.268 | 0.59 | | |
| 3* | 5.062 | 0.80 | 1.56650 | 37.6 |
| 4* | 8.515 | 3.14 | | |
| 5 (SP) | ∞ | 1.67 | | |
| 6 | ∞ | 1.44 | | |
| 7* | 11.016 | 2.59 | 1.53504 | 55.7 |
| 8* | −21.069 | 2.64 | | |
| 9* | −3.021 | 0.90 | 1.67070 | 19.3 |
| 10* | −5.202 | 0.25 | | |
| 11* | 88.777 | 2.86 | 1.53504 | 55.7 |
| 12* | −7.238 | 0.30 | | |
| 13* | 3.574 | 1.50 | 1.53504 | 55.7 |
| 14* | 3.130 | 5.90 | | |
| 15 | ∞ | 1.00 | 1.51633 | 64.1 |
| 16 | ∞ | | 1.00 | |
| Image Plane | ∞ | | | |

Aspheric Data

1st Surface $$K=-4.07674e+01\ A4=1.10868e-03\ A6=-1.90651e-05$$

$$A8=1.38389e-07\ A10=-1.18466e-09$$

2nd Surface $$K=2.17417e+01\ A4=3.81180e-04\ A6=4.64102e-05$$

$$A8=-2.02203e-06\ A10=1.32034e-08$$

3rd Surface $$K=1.07001e-01\ A4=-2.61288-03\ A6=1.36038e-04$$

$$A8=-5.27034e-06$$

4th Surface $$K=2.73336e+00\ A4=-1.14573e-04\ A6=-1.63469e-05$$

$$A8=-7.06508e-08\ A10=-6.10615e-08$$

-continued

7th Surface $$K=-1.2477e+01\ A4=7.15943e-04\ A6=-8.23917e-05$$

$$A8=3.84937e-06\ A10=-2.57148e-07$$

8th Surface $$K=-8.79701e+01\ A4=-1.52391e-03\ A6=1.01237e-05$$

$$A8=1.40286e-06\ A10=-1.79280e-07$$

9th Surface $$K=-3.02436e+00\ A4=-3.94589e-03\ A6=5.27906e-04$$

$$A8=-2.12493e-05\ A10=2.95316e-07$$

10th Surface $$K=-2.18585e+00\ A4=6.68795e-04\ A6=6.56385e-05$$

$$A8=-1.36724e-06\ A10=-5.17070e-09$$

11th Surface $$K=0.00000e+00\ A4=6.11865e-04\ A6=-8.35283e-06$$

$$A8=-1.53958e-06\ A10=2.81612e-08$$

12th Surface $$K=0.00000e+00\ A4=9.63174e-04\ A6=5.81917e-05$$

$$A8=-3.34797e-06\ A10=4.91582e-08$$

13th Surface $$K=-2.13272e+00\ A4=-3.80277e-04\ A6=-4.28269e-05$$

$$A8=1.06757e-06\ A10=-7.47656e-09$$

14th Surface $$K=-1.59044e+00\ A4=-1.96264e-03\ A6=2.17006e-05$$

$$A8=-1.48671e-08\ A10=-9.59665e-10$$

| | |
|---|---|
| Focal Length | 11.68 |
| Fno | 2.88 |
| Half Angle of View[°] | 41.11 |
| Image Height | 10.19 |
| Overall Lens Length | 27.14 |
| bf | 7.56 |

Numerical Example 3

UNIT: mm

SURFACE DATA

| Surface No. | r | d | nd | νd |
|---|---|---|---|---|
| 1* | −38.036 | 0.64 | 1.53504 | 55.7 |
| 2* | 5.167 | 1.43 | | |
| 3* | 4.455 | 0.89 | 1.56650 | 37.6 |
| 4* | 9.303 | 1.64 | | |
| 5 (SP) | ∞ | 0.90 | | |
| 6* | 4.557 | 1.24 | 1.53504 | 55.7 |
| 7* | 22.115 | 0.37 | | |
| 8 | ∞ | 0.84 | | |
| 9* | −24.038 | 1.10 | 1.53504 | 55.7 |
| 10* | −6.759 | 0.28 | | |
| 11* | −5.133 | 0.64 | 1.67070 | 19.3 |
| 12* | −25.587 | 1.16 | | |
| 13* | 10.785 | 2.15 | 1.53504 | 55.7 |

-continued

| SURFACE DATA | | | | |
|---|---|---|---|---|
| Surface No. | r | d | nd | νd |
| 14* | −6.521 | 0.71 | | |
| 15* | 3.837 | 1.43 | 1.53504 | 55.7 |
| 16* | 2.563 | 2.19 | | |
| 17 | ∞ | 1.00 | 1.51633 | 64.1 |
| 18 | ∞ | 0.50 | | |
| Image Plane | ∞ | | | |

Aspheric Data

1st Surface $$K = 4.12149e+01 \; A4 = 3.15700e+03 \; A6 = -1.31654e-04$$

$$A8 = 2.27926e-06 \; A10 = -9.41224e-09$$

2nd Surface $$K = -2.79289e+00 \; A4 = 1.50399e-03 \; A6 = 2.94801e-04$$

$$A8 = -2.61172e-05 \; A10 = 4.92465e-07$$

3rd Surface $$K = -2.62005e-01 \; A4 = -7.20964e-03 \; A6 = 3.09769e-04$$

$$A8 = -7.26320e-06$$

4th Surface $$K = 4.13221e+00 \; A4 = -5.72278e-03 \; A6 = 2.42695e-04$$

$$A8 = -3.50220e-06 \; A10 = -3.08850e-08$$

6th Surface $$K = -8.24652e+00 \; A4 = 9.24620e-03 \; A6 = -8.85414e-04$$

$$A8 = 7.72586e-05 \; A10 = -2.22466e-06$$

7th Surface $$K = 6.86650e+01 \; A4 = -3.41143e-03 \; A6 = 3.96825e-05$$

$$A8 = -4.16267e-05 \; A10 = 1.29675e-06$$

9th Surface $$K = -1.84977e+01 \; A4 = -7.21946e-03 \; A6 = -1.05757e-03$$

$$A8 = 7.95027e-05 \; A10 = -9.17142e-06$$

10th Surface $$K = 4.03970e+00 \; A4 = 5.82121e-04 \; A6 = -2.21627e-03$$

$$A8 = 2.26138e-04 \; A10 = -9.11081e-06$$

11th Surface $$K = -3.86773e-01 \; A4 = -4.70686e-03 \; A6 = -2.91012e-04$$

$$A8 = 3.95021e-05 \; A10 = -3.66388e-06$$

12th Surface $$K = -7.60671e+01 \; A4 = -9.87072e-03 \; A6 = 1.29344e-03$$

$$A8 = -1.09791e-04 \; A10 = 4.55041e-06$$

13th Surface $$K = 0.00000e+00 \; A4 = 3.16196e-04 \; A6 = -3.29133e-05$$

$$A8 = -4.19478e-07$$

-continued

14th Surface $$K = 0.00000e+00 \; A4 = 6.03630e-03 \; A6 = -1.80138e-04$$

$$A8 = 1.70288e-06$$

15th Surface $$K = -1.42183e+00 \; A4 = -4.75446e-03 \; A6 = 6.02793e-05$$

$$A8 = 4.89924e-07 \; A10 = -9.42870e-09$$

16th Surface $$K = -2.46417e+00 \; A4 = -2.71222e-03 \; A6 = 4.72474e-05$$

$$A8 = -5.40342e-07 \; A10 = 2.68759e-09$$

| | |
|---|---|
| Focal Length | 6.75 |
| Fno | 1.85 |
| Half Angle of View[°] | 46.56 |
| Image Height | 7.13 |
| Overall Lens Length | 18.77 |
| bf | 3.35 |

Numerical Example 4

UNIT: mm

| SURFACE DATA | | | | |
|---|---|---|---|---|
| Surface No. | r | d | nd | νd |
| 1* | 51.523 | 0.90 | 1.53504 | 55.7 |
| 2* | 27.071 | 2.16 | | |
| 3* | −9.038 | 0.90 | 1.53504 | 55.7 |
| 4* | 20.238 | 1.89 | | |
| 5* | 4.850 | 1.74 | 1.56650 | 37.6 |
| 6* | 11.149 | 2.82 | | |
| 7 (SP) | ∞ | 1.09 | | |
| 8 | ∞ | 1.34 | | |
| 9* | 11.402 | 2.87 | 1.53504 | 55.7 |
| 10* | −14.044 | 1.28 | | |
| 11* | −3.237 | 0.90 | 1.67070 | 19.3 |
| 12* | −6.923 | 0.25 | | |
| 13* | 38.368 | 2.84 | 1.53504 | 55.7 |
| 14* | −6.796 | 0.30 | | |
| 15* | 3.419 | 1.50 | 1.53504 | 55.7 |
| 16* | 3.263 | 5.50 | | |
| 17 | ∞ | 1.00 | 1.51633 | 64.1 |
| 18 | ∞ | 1.00 | | |
| Image Plane | ∞ | | | |

Aspheric Data

1st Surface $$K = 0.00000e+00 \; A4 = 6.55233e-06 \; A6 = -1.20848e-08$$

$$A8 = -1.08467e-10$$

2nd Surface $$K = 0.00000e+00 \; A4 = -1.16368e-05 \; A6 = -1.86912e-08$$

$$A8 = -1.12917e-09$$

3rd Surface $$K = -1.41073e+01 \; A4 = 1.19583e-03 \; A6 = -1.95674e-05$$

$$A8 = 1.68752e \; A10 = -8.13412e-10$$

-continued

4th Surface $$K = 7.60927e+00\ A4 = 2.63081e-04\ A6 = 6.13058e-05$$

$$A8 = -1.94984e-06\ A10 = 1.16964e-08$$

5th Surface $$K = 2.90553e-02\ A4 = -2.60931e-03\ A6 = 1.35053e-04$$

$$A8 = -3.52506e-06$$

6th Surface $$K = 6.35254e+00\ A4 = -4.50061e-05\ A6 = 2.29636e-05$$

$$A8 = 1.17117e-06\ A10 = -9.77895e-08$$

9th Surface $$K = -1.29476e+01\ A4 = 6.70861e-04\ A6 = -7.38222e-05$$

$$A8 = 2.38318e-06\ A10 = -1.42404e-07$$

10th Surface $$K = -3.81471e+01\ A4 = -2.02368e-03\ A6 = 2.70207e-05$$

$$A8 = 2.02868e-06\ A10 = -1.87053e-07$$

11th Surface $$K = -3.71165e+00\ A4 = -4.37425e-03\ A6 = 5.29985e-04$$

$$A8 = -2.10773e-05\ A10 = 2.82040e-07$$

12th Surface $$K = -1.75018e+00\ A4 = 8.54845e-04\ A6 = 4.01604e-05$$

$$A8 = -6.75414e-07\ A10 = -1.44633e-08$$

13th Surface $$K = 0.00000e+00\ A4 = 3.67917e-04\ A6 = -2.03864e-05$$

$$A8 = -1.19285e-06\ A10 = 2.44324e-08$$

14th Surface $$K = 0.00000e+00\ A4 = 9.64279e-04\ A6 = 6.10981e-05$$

$$A8 = -3.70667e-06\ A10 = 5.73442e-08$$

15th Surface $$K = -2.12376e+00\ A4 = -2.09197e-04\ A6 = -4.43678e-05$$

$$A8 = 1.04209e-06\ A10 = -7.10350e-09$$

16th Surface $$K = -1.60337e+00\ A4 = -1.75759e-03\ A6 = 1.67829e-05$$

$$A8 = 4.06969e-08\ A10 = -1.19228e-09$$

| | |
|---|---|
| Focal Length | 8.41 |
| Fno | 2.88 |
| Half Angle of View[°] | 50.47 |
| Image Height | 10.19 |
| Overall Lens Length | 29.95 |
| bf | 7.16 |

TABLE 1

| | Numerical Example | | | |
|---|---|---|---|---|
| | 1 | 2 | 3 | 4 |
| (1)0.10 ≤ STL/TTL ≤ 0.50 | 0.196 | 0.230 | 0.135 | 0.175 |
| (2)3.0 ≤ \|fA/f\| | 9.074 | 11.269 | 3.776 | 9.314 |
| (3)0.01 ≤ bf/f ≤ 1.00 | 0.782 | 0.648 | 0.497 | 0.851 |
| (4)0.4 ≤ STf/STb ≤ 0.9 | 0.743 | 0.748 | 0.757 | 0.715 |
| (5)3.0 ≤ \|fi/f\| | 13.534 | 22.772 | 3.505 | 6.770 |
| (6)1.50 ≤ Ndi ≤ 1.80 | 1.535 | 1.535 | 1.535 | 1.535 |
| (7)30 ≤ νdi ≤ 65 | 55.73 | 55.73 | 55.73 | 55.73 |
| (8)1.50 ≤ Ndn ≤ 1.80 | 1.535 | 1.535 | 1.535 | 1.535 |
| (9)30 ≤ νdn ≤ 65 | 55.73 | 55.73 | 55.73 | 55.73 |
| (10)1.50 ≤ Ndn ≤ 1.80 | 1.567 | 1.567 | 1.567 | 1.567 |
| (11)18 ≤ νdn ≤ 45 | 37.60 | 37.60 | 37.60 | 37.60 |

Image Pickup Apparatus

Figure 9:
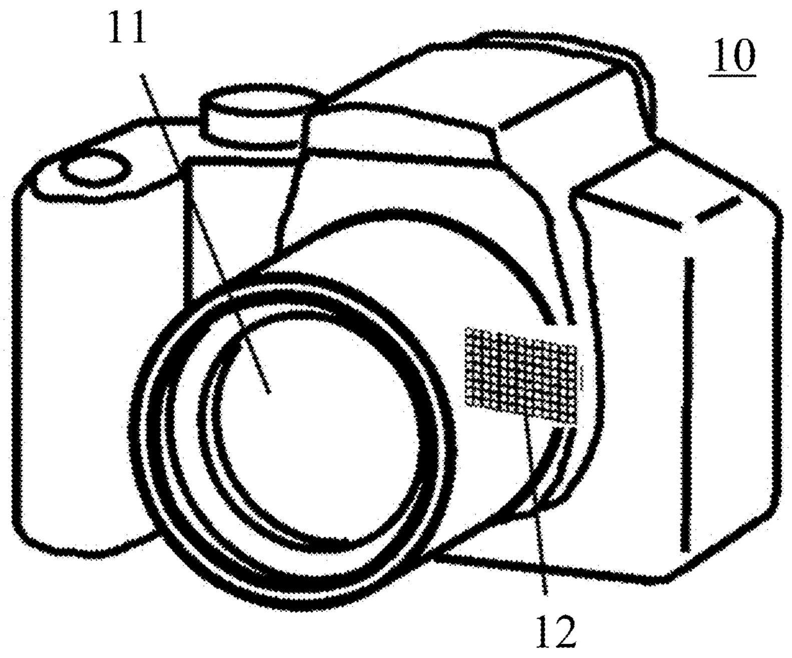
FIG. 9 illustrates an image pickup apparatus having the optical system according to any one of Examples 1 to 4.

FIG. 9 illustrates a digital still camera 10 as an image pickup apparatus using the optical system according to any one of the above examples as an imaging optical system. The camera 10 includes an imaging optical system 11 as one of the optical systems according to Examples 1 to 4. The camera 10 further includes a solid-state image sensor 12 such as a CCD sensor or CMOS sensor inside the body of the camera 10, which captures an optical image (object image) formed by the imaging optical system 11.

Using the optical system of each example, a camera can have a reduced size, a wide angle, and high optical performance.

The camera may be a single-lens reflex camera with a quick-turn mirror, or a mirrorless camera without a quick-turn mirror.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide an optical system that can have a reduced size and weight, and a wide angle, and can secure space enough to dispose an optical element such as an iris diaphragm, an ND filter, and a shutter, at a proper place.

This application claims priority to Japanese Patent Application No. 2023-180667, which was filed on Oct. 20, 2023, and which is hereby incorporated by reference herein in its entirety.

What is claimed is:

1. An optical system comprising:

a front group;

an aperture stop configured to determine an on-axis light beam; and a rear group, wherein the front group includes a negative lens, and a first positive lens disposed on an image side of the negative lens, wherein the rear group includes at least two positive lenses, and wherein the following inequalities are satisfied:

$$0.10 \leq ST/TTL \leq 0.50$$

$$30 \leq |fA/f|$$

$$0.01 \leq Bf/f \leq 1.00$$

where ST is a distance on an optical axis between a lens surface on the image side of a lens adjacent to and disposed on the object side of the aperture stop and a lens surface on the object side of a lens adjacent to and disposed on the image side of the aperture stop, TTL is an air equivalent value of a distance on the optical axis from a lens surface closest to an object of the optical system to an image plane, Bf is an air equivalent value of a distance on the optical axis from a lens surface closest to the image plane to the image plane, f is a focal length of the optical system, and fA is a focal length of the front group.

2. The optical system according to claim 1, wherein the lens surface closest to the image plane is an aspheric surface having at least one inflection point.

3. The optical system according to claim 1, wherein the following inequality is satisfied:

$$0.4 \leq STf/STb \leq 0.9$$

where STf is a distance on the optical axis between the aperture stop and a lens surface on the object side of a lens closest to the image plane of the optical system, and STb is a distance on the optical axis between the aperture stop and a point obtained by projecting onto the optical axis a point closest to the image plane on a lens surface on the image side of the lens closest to the image plane.

4. The optical system according to claim 1, wherein the following inequality is satisfied:

$$3.0 \leq |fi/f|$$

where fi is a focal length of a lens closest to the image plane.

5. The optical system according to claim 1, wherein the following inequalities are satisfied:

$$1.50 \leq Ndi \leq 1.80$$

$$30 \leq \nu di \leq 65$$

where Ndi is a refractive index of a lens closest to the image plane for d-line, and νdi is an Abbe number based on the d-line of the lens closest to the image plane.

6. The optical system according to claim 1, wherein the following inequalities are satisfied:

$$1.50 \leq Ndn \leq 1.80$$

$$30 \leq \nu dn \leq 65$$

where Ndn is a refractive index for d-line of the negative lens, and νdi is an Abbe number based on the d-line of a lens closest to the image plane.

7. The optical system according to claim 1, wherein the following inequalities are satisfied:

$$1.50 \leq Ndp \leq 1.80$$

$$18 \leq \nu dp \leq 45$$

where Ndp is a refractive index for d-line of a positive lens that is any one of the at least one positive lens on the object side of the aperture stop, and νdp is an Abbe number of the positive lens based on the d-line.

8. The optical system according to claim 1, wherein the two lenses adjacent to and disposed on the object side and the image side of the aperture stop are positive lenses.

9. The optical system according to claim 1, comprising, in order from the object side to the image side, the negative lens, the first positive lens, the aperture stop, a positive lens, a negative lens, a positive lens, and a positive lens.

10. The optical system according to claim 1, comprising, in order from the object side to the image side, the negative lens, the first positive lens, the aperture stop, a positive lens, a positive lens, a negative lens, a positive lens, and a negative lens.

11. The optical system according to claim 1, comprising, in order from the object side to the image side, the negative lens, a negative lens, the first positive lens, the aperture stop, a positive lens, a negative lens, a positive lens, and a positive lens.

12. The optical system according to claim 1, further comprising a flare cut diaphragm disposed on the image side of the aperture stop.

13. An image pickup apparatus comprising:

an optical system; and an image sensor configured to capture an image of an object through the optical system, wherein the optical system includes:

a front group;

an aperture stop configured to determine an on-axis light beam; and a rear group, wherein the front group includes a negative lens, and a first positive lens disposed on an image side of the negative lens, wherein the rear group includes at least two positive lenses, and wherein the following inequalities are satisfied:

$$0.10 \leq ST/TTL \leq 0.50$$

$$30 \leq |fA/f|$$

$$0.01 \leq Bf/f \leq 1.002$$

where ST is a distance on an optical axis between a lens surface on the image side of a lens adjacent to and disposed on the object side of the aperture stop and a lens surface on the object side of a lens adjacent to and disposed on the image side of the aperture stop, TTL is an air equivalent value of a distance on the optical axis from a lens surface closest to the object of the optical system to an image plane, Bf is an air equivalent value of a distance on the optical axis from a lens surface closest to the image plane to the image plane, f is a focal length of the optical system, and fA is a focal length of the front group.

* * * * *